US006535728B1

(12) United States Patent
Perfit et al.

(10) Patent No.: US 6,535,728 B1
(45) Date of Patent: Mar. 18, 2003

(54) EVENT MANAGER FOR USE IN FRAUD DETECTION

(75) Inventors: Michael Adam Perfit, Gulfport, FL (US); Darin L. Buchanan, Longmont, CO (US); Scott J. Samek, Broomfield, CO (US); Timothy W. Butler, Boulder, CO (US); Elizabeth Mancini, Groton, MA (US); Michael J. Arena, Lexington, MA (US); Karen G. Wise, Wayland, MA (US); Michael B. Farrar, Marblehead, MA (US); Michael D. Uftring, Billerica, MA (US); Theodore J. Wilson, Needham, MA (US); Richard H. Antell, Sherborn, MA (US)

(73) Assignee: Lightbridge, Inc., Burlington, MA (US)

( * ) Notice: Subject to any disclaimer, the term of this patent is extended or adjusted under 35 U.S.C. 154(b) by 0 days.

(21) Appl. No.: 09/443,065

(22) Filed: Nov. 18, 1999

Related U.S. Application Data

(60) Provisional application No. 60/108,952, filed on Nov. 18, 1998, and provisional application No. 60/108,971, filed on Nov. 18, 1998.

(51) Int. Cl.$^7$ ................................................ H04M 1/66
(52) U.S. Cl. ...................... 455/410; 455/411; 379/145; 379/189
(58) Field of Search ................................ 455/410, 411; 379/144.03, 145, 189

(56) References Cited

U.S. PATENT DOCUMENTS

| 5,345,595 A | | 9/1994 | Johnson et al. ............. 455/33.1 |
|---|---|---|---|
| 5,495,521 A | * | 2/1996 | Rangacher ................... 379/145 |
| 5,627,886 A | * | 5/1997 | Bowman ..................... 379/111 |
| 5,790,645 A | * | 8/1998 | Fawcett et al. ............. 379/189 |
| 5,819,226 A | * | 10/1998 | Gopinathan et al. .......... 705/44 |
| 5,905,949 A | * | 5/1999 | Hawkes et al. ............. 380/250 |
| 5,950,121 A | * | 9/1999 | Kaminsky et al. .......... 455/410 |
| 5,966,650 A | * | 10/1999 | Hobson et al. ............. 455/410 |
| 5,978,669 A | * | 11/1999 | Sanmugam .................. 455/410 |
| 6,327,352 B1 | * | 12/2001 | Betts et al. ............ 379/114.14 |
| 6,370,373 B1 | * | 4/2002 | Gerth et al. ................. 380/250 |

OTHER PUBLICATIONS

Davis et al., "Management of Cellular Fraud: Knowledge-Based Detection, Classification and Prevention", GTE Laboratories Inc., (May, 24, 1993), pp. 155–164.

* cited by examiner

Primary Examiner—Thanh Cong Le
Assistant Examiner—Andrew T Harry
(74) Attorney, Agent, or Firm—Foley Hoag LLP

(57) ABSTRACT

A fraud detection system receives data relating to telecommunications activity. Event generators generate events from the received data, with each event having a weight corresponding to an increased or decreased likelihood of fraud. The aggregated events for a subject (a subscriber or an account) determine a score for the subject, which is used to prioritize the subject in an investigation queue. Human analysts are assigned to open investigations on the investigation queue according to the priority of subjects. In this manner, investigation resources can be applied more effectively to high-risk subscribers and events.

25 Claims, 9 Drawing Sheets

| | 422 | 424 | 426 |
|---|---|---|---|
| | CATEGORY | TYPE | SUB-TYPE |
| 430 | CHANGE | INFO | NAME, ADDRESS, PHONE, ... |
| 432 | CHANGE | RATE PLAN | 30, 60, 90, 90+ |
| 434 | BILL | PAY | CASH, CHECK, VERIF, CREDIT, PPC, DEBIT |
| 436 | BILL | NPAY | GEN, PPCPB, PARTP |
| 438 | LINK | CCARD | ACC, BILL |

Fig. 6

EVENT MANAGER FOR USE IN FRAUD DETECTION

CROSS-REFERENCE TO RELATED APPLICATIONS

This application claims the benefit of U.S. Provisional Application No. 60/108,952 and U.S. Provisional Application No. 60/108,971, both filed on Nov. 18, 1998. The disclosure of those applications is incorporated herein by reference.

BACKGROUND OF THE INVENTION

1. Field of the Invention

This application relates to the field of telecommunications and more particularly to the field of fraud detection in telecommunications systems.

2. Description of Related Art

Along with the growth in wireless telecommunications, there has been a growth in telecommunications fraud. The current techniques for committing fraud are generally known and understood. Fraud may be as simple as the physical theft of a wireless handset, or applying for a wireless subscription with no intention of paying. Other fraud is more sophisticated. For example, tumbling-clone fraud entails the interception of a number of valid identification numbers from airborne wireless traffic, and the use of each identifier in sequence to render detection of the fraudulent activity more difficult. Also, some of the fraudulent activity focuses on fraudulently obtaining subscriptions. For example, a thief might falsify application information or steal valid personal information from another individual.

However, understanding the modalities for wireless fraud does not provide any specific strategy for addressing the fraud. A wireless carrier may have millions of subscribers, who may collectively make millions of calls each day. Even if some of the characteristics of fraudulent activity are known, it may be impractical to allocate human resources to examine each call individually. If a typical wireless telecommunications system handles two million calls each day, perhaps only a few hundred of these calls should be examined closely. One approach to "filtering" this mass of information is disclosed in U.S. Pat. No. 5,615,408, which describes a system for credit-based management of telecommunications activity. According to the '408 patent, each call within the system is examined for possible credit problems among subscribers, and a credit alert is generated when a credit risk is present.

While the system disclosed in the '408 patent presents a significant advance in telecommunications monitoring, it may fail to detect certain fraudulent activity. For example, an identical identification number may occur simultaneously in two disjoint cells, which may not present any credit issues, but does indicate that a handset has been cloned. Additionally, the information available for a call may only suggest a heightened probability of fraud rather than a definite instance of fraud. As the search criteria for a fraud detection system broaden, more and more calls must be examined. Furthermore, automated responses, such as immediate termination of service, may be undesirable, particularly for legitimate subscribers that cross a statistical line into ostensibly fraudulent activity.

There remains a need for a telecommunications fraud detection system that can handle large call volume while permitting individualized attention to possibly fraudulent activity. The system should prioritize possibly fraudulent activity so that a human analyst can be assigned to investigate instances with a high likelihood of fraud.

SUMMARY OF THE INVENTION

According to the principles of the invention, a fraud detection system receives data relating to telecommunications activity. Event generators generate events from the received data, with each event having a weight corresponding to an increased or decreased likelihood of fraud. The aggregated events for a subject (a subscriber or an account) determine a score for the subject, which is used to prioritize the subject in an investigation queue. Human analysts are assigned to open investigations on the investigation queue according to the priority of subjects. In this manner, investigation resources can be applied more effectively to high-risk subscribers and events.

In one embodiment, a method for detecting fraud in a telecommunications system according to the principles of the invention includes: receiving one or more events relating to a subscriber; combining the one or more events to provide a score; and storing the subscriber and the score in an investigation queue if the score exceeds a predetermined threshold.

In this aspect, the method may further include repeating the above for a plurality of subscribers; and storing a plurality of suspect subscribers in the investigation queue, each one of the plurality of suspect subscribers having a score that exceeds the predetermined threshold. The method may further include prioritizing the investigation queue according to the plurality of scores. The method may include updating the score of one of the plurality of suspect subscribers to provide an updated score, and removing the one of the plurality of suspect subscribers from the investigation queue if the updated score does not exceed the predetermined threshold. The method may also include assigning a human analyst to investigate one of the plurality of suspect subscribers. The method may include determining a region for each one of the plurality of suspect subscribers; and assigning a regional human analyst to investigate those ones of the plurality of suspect subscribers having a particular region. In this method assigning a human analyst may further include: receiving a request to investigate from the human analyst; assigning to the human analyst a one of the plurality of suspect subscribers having a highest priority; and removing the one of the plurality of suspect subscribers from the investigation queue.

In the method, combining the one or more events to provide a score may further include: weighting the one or more events according to one or more event weights, thereby providing one or more weighted events; and summing the one or more weighted events to provide a score. This method may further include aging each of the one or more weighted events using a half-life. The one or more event weights may be discounted according to a match quality. The one or more event weights may be determined using logistic regression. Combining the one or more events to provide a score may further include feeding the one or more events to a neural network, the neural network being trained to generate a score indicative of possible fraud from the one or more events. This method may further include prioritizing the investigation queue according to the plurality of scores.

In another aspect, a system for detecting telecommunications fraud according to the principles of the invention includes: means for receiving one or more events relating to a subscriber; means for combining the one or more events to provide a score; and means for storing the subscriber and the score in an investigation queue if the score exceeds a predetermined threshold.

In this aspect, the system may further include: means for applying the receiving means, the combining means, and the storing means to a plurality of subscribers; and means for storing a plurality of suspect subscribers in the investigation queue, each one of the plurality of suspect subscribers having a score that exceed the predetermined threshold. The system may further include means for prioritizing the investigation queue according to the plurality of scores. The system may further include means for removing one of the plurality of suspect subscribers from the investigation queue if the one of the plurality of suspect subscribers has not been investigated within a predetermined time. The system may further include means for assigning a human analyst to investigate one of the plurality of suspect subscribers.

A system according to the principles of the invention may further include: means for determining a region for each one of the plurality of suspect subscribers; and means for assigning a regional human analyst to investigate those ones of the plurality of suspect subscribers having a particular region. The assigning means may include: means for receiving a request to investigate from the human analyst; and means for assigning to the human analyst a one of the plurality of suspect subscribers having a highest priority. The combining means may further include: means for weighting the one or more events according to one or more event weights, thereby providing one or more weighted events; and means for summing the one or more weighted events to provide a score.

The system may further include means for aging each of the one or more weighted events using a half-life. The one or more event weights may be discounted according to a match quality. The one or more event weights may be determined using logistic regression. The combining means may further include means for feeding the one or more events to a neural network, the neural network being trained to generate a score indicative of possible fraud from the one or more events. The system may further include means for prioritizing the investigation queue according to the plurality of scores.

In another aspect, a computer program for detecting telecommunications fraud according to the principles of the invention may be embodied in machine executable code including: machine executable code to receive one or more events relating to a subscriber; machine executable code to combine the one or more events to provide a score; and machine executable code to store the subscriber and the score in an investigation queue if the score exceeds a predetermined threshold.

In this aspect, the computer program may further include: machine executable code to repeat the machine executable code to receive, the machine executable code to combine, and the machine executable code to store for a plurality of subscribers; and machine executable code to store a plurality of suspect subscribers in the investigation queue, each one of the plurality of suspect subscribers having a score that exceeds the predetermined threshold. The computer program may further include machine executable code to prioritize the investigation queue according to the plurality of scores. The computer program may further include machine executable code to remove one of the plurality of suspect subscribers from the investigation queue if the one of the plurality of suspect subscribers has not been investigated within a predetermined time.

Further in this aspect, the computer program may include machine executable code to assign a human analyst to investigate one of the plurality of suspect subscribers. The computer program may further include machine executable code to determine a region for each one of the plurality of suspect subscribers; and machine executable code to assign a regional human analyst to investigate those ones of the plurality of suspect subscribers having a particular region. The machine executable code to assign a human analyst may further include machine executable code to receive a request to investigate from the human analyst; and machine executable code to assign to the human analyst a one of the plurality of suspect subscribers having a highest priority.

The machine executable code to combine the one or more events to provide a score may further include machine executable code to weight the one or more events according to one or more event weights, thereby providing one or more weighted events; and machine executable code to sum the one or more weighted events to provide a score. The computer program may further include machine executable code to age each of the one or more weighted events using a half-life. One or more event weights may be discounted according to a match quality. The one or more event weights may be determined using logistic regression. The machine executable code to combine the one or more events to provide a score may further include machine executable code to feed the one or more events to a neural network, the neural network being trained to generate a score indicative of possible fraud from the one or more events. The computer program may further include machine executable code to prioritize the investigation queue according to the plurality of scores.

BRIEF DESCRIPTION OF DRAWINGS

The foregoing and other objects and advantages of the invention will be appreciated more fully from the following further description thereof, with reference to the accompanying drawings, wherein:

FIG. 6 shows the events generated by one embodiment of the provisioning loader process, using monthly billing information;

DETAILED DESCRIPTION OF THE PREFERRED EMBODIMENT(s)

To provide an overall understanding of the invention, certain illustrative embodiments will now be described, including an event manager for fraud detection in a telecommunications system. However, it will be understood by those of ordinary skill in the art that the methods and systems described herein can be suitably adapted to any environment where human analysts monitor a high volume of discrete events in real time, such as a financial transaction system or a supervised data network.

Figure 1:
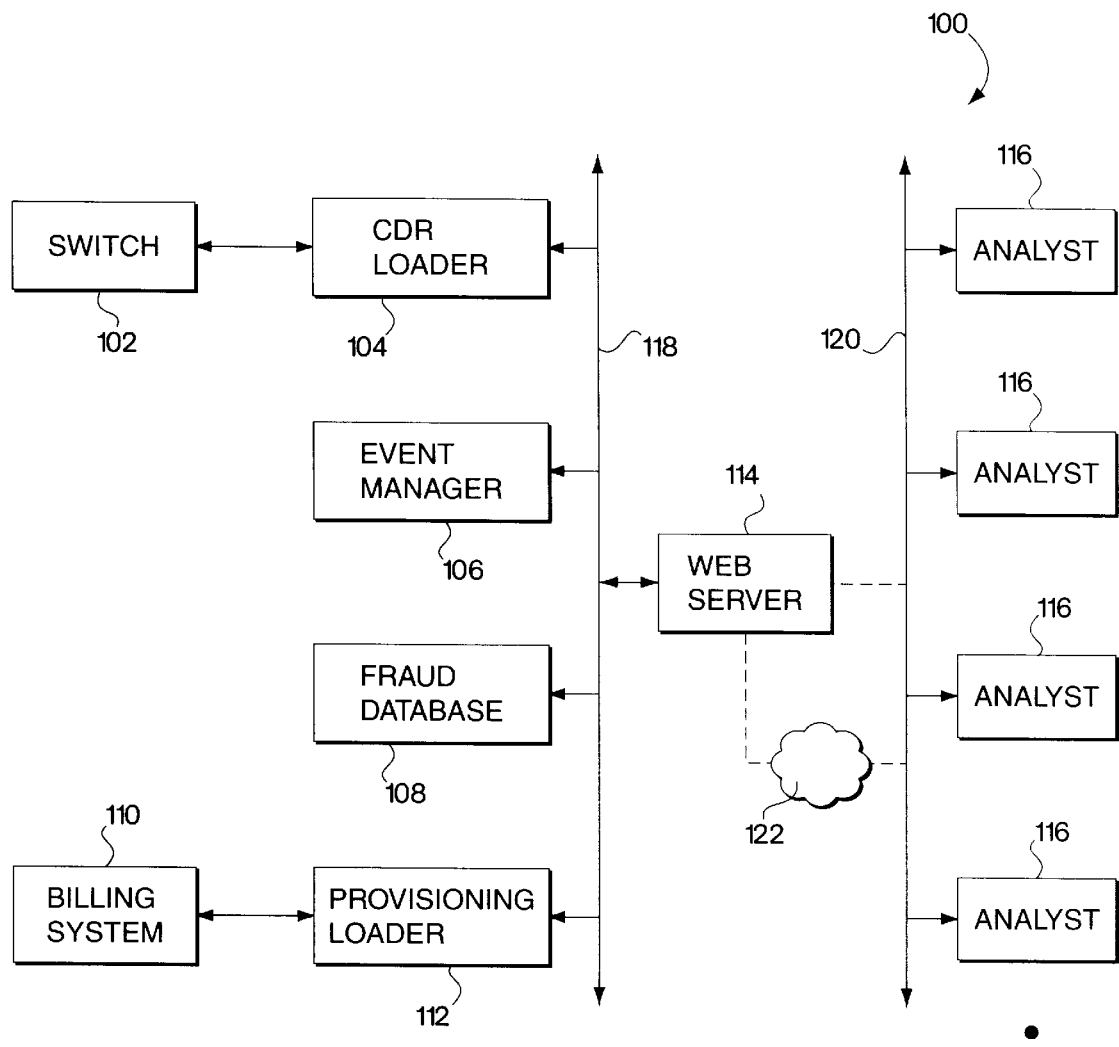
FIG. 1 is a block diagram of a telecommunications fraud detection system according to the principles of the invention.

FIG. 1 is a block diagram of a telecommunications fraud detection system according to one embodiment of the present invention. The fraud detection system 100 comprises a switch 102 connected in a communicating relationship to a Call Detail Record ("CDR") loader 104, an event manager 106, a fraud database 108, and a billing system 110 connected in a communicating relationship with a provisioning loader 112. The CDR loader 104, the event manager 106, the fraud database 108, and the provisioning loader are further connected in a communicating relationship with a web server 114. The web server 114 is connected in a communicating relationship with one or more analyst devices 116.

The switch 102 may be any wired or wireless telecommunications switch, or may be a mediation device for aggregating a number of switches. The switch 102 may also include a roamer tape or roamer network connection to receive call information relating to local subscribers from other switches or geographic regions. The switch 102 forwards CDR's to the CDR loader 104, which receives one or more records for each call from the switch 102, and converts each received record into a common CDR format.

The CDR loader 104 generates events based upon the received CDR's. The CDR loader 104 is preferably a server, such as one manufactured by Sun Microsystems or Hewlett Packard, with a mass storage device suitable to the volume of CDR's received from the switch 102, and including a suitable interface to a data network 118. The data network 118 is preferably a 100Base-T network compatible with the Institute of Electrical and Electronics Engineers ("IEEE") 802.3 standard, commonly referred to as "Ethernet." The data network 118 may also include wireless communication systems or internetwork components such as the Internet or the Public Switched Telephone Network. The CDR loader 104 also includes suitable processing power to execute programs that examine received CDR's and generate events based upon the received CDR's. The CDR loader 104 generates events that are transmitted to the event manager 106 over the data network 118.

The fraud database 108 is preferably a server, such as one manufactured by Sun Microsystems or Hewlett Packard. The fraud database 108 includes a suitable interface to the data network 118, and suitable processing power to execute programs that access and maintain a database of subscribers that have committed fraud, or are otherwise associated with a heightened risk of fraudulent activity. The fraud database 108 also executes programs to examine new provisioning data, and in particular, changes to account information, received from the provisioning loader over the data network 118, for fraud risks. Based upon this examination, the fraud database 108 generates events that are transmitted to the event manager 106 over the data network 118.

The provisioning loader 112 is preferably a server, such as one manufactured by Sun Microsystems or Hewlett Packard. The provisioning loader 112 includes suitable interfaces to the billing system 110, the fraud database 108, and the data network 118. The provisioning loader 112 receives account and billing data from the billing system 110, and examines the data to detect possible fraud. Based upon this examination, the provisioning loader 112 generates events that are transmitted to the event manager 106 over the data network 118. The provisioning loader also forwards new and changed account data to the fraud database 108. The billing system 110 may be any billing system, typically a proprietary billing system operated by a telecommunications carrier or service provider seeking to detect possible fraud. The billing system 110 may format provisioning and billing data in a format adapted to the provisioning loader 112, or the provisioning loader may perform any required formatting or transformation required for further operations. The terms "provisioning data," "provisioning information," and the like, as used herein, are intended to refer to billing information, account information, and any other information provided by a carrier that relates to subscribers or accounts.

The event manager 106 receives events from the CDR loader 104, the fraud database 108, and the provisioning loader 112. Other events may be received from other event generators connected to the data network 118, which may include, for example, credit bureaus or other remote fraud detection systems. The event manager 106 is a server, such as one manufactured by Sun Microsystems or Hewlett Packard, and includes a suitable interface to the data network 118. The event manager 106 also includes a processor with sufficient processing power to handle event traffic from the event generators connected to the data network 118, and a mass storage device suitable to storing received events. The event manager maintains cumulative scores for subscribers and an investigation queue that includes subscribers posing a likelihood of fraud.

The web server 114 is preferably an Intel-based server, such as one manufactured by Compaq or Gateway. The web server 114 provides a graphical user interface for the analyst devices 116, and a functional interface through which analyst devices 116 may access the event manager 106 and data stored in the event generators, i.e., the CDR loader 104, the fraud database 108, and the provisioning loader 112.

The analyst devices 116 are computers, preferably thin client stations, including suitable interfaces for connection with the web server 114. An analyst network 120 between the analyst devices 116 and the web server 114 may include any data network, such as a 10Base-T Ethernet network. In a preferred embodiment, the web server 114 communicates with the analyst devices 116 using the World Wide Web. The analyst network 120 may also include wireless communication systems or internetwork components, such as leased lines, frame relay components, the Internet, or the Public Switched Telephone Network, as indicated generally by an alternative network 122. It will be appreciated that the analyst network 120 and the data network 118 may also be the same network, or may share some internetwork components.

It will be appreciated by those skilled in the art that a number of topologies are possible for the fraud detection system 100. Each server may be a separate physical server, or some of the servers may be logical servers on a single physical server. Conversely, a single server may consist of several physically separate servers configured to operate as a single logical server. The analyst devices 116 may be at a single location sharing a local area network, or may be distributed over a wide geographical area. The data network 118 is preferably a dedicated physical network, but may also be a virtual private network, a wide-area or local area network, or may include some combination of these. Any computer and/or network topology may be used with the present invention, provided it offers sufficient communication and processing capacity to manage data from the switch 102 and the billing system 110.

Figure 2:
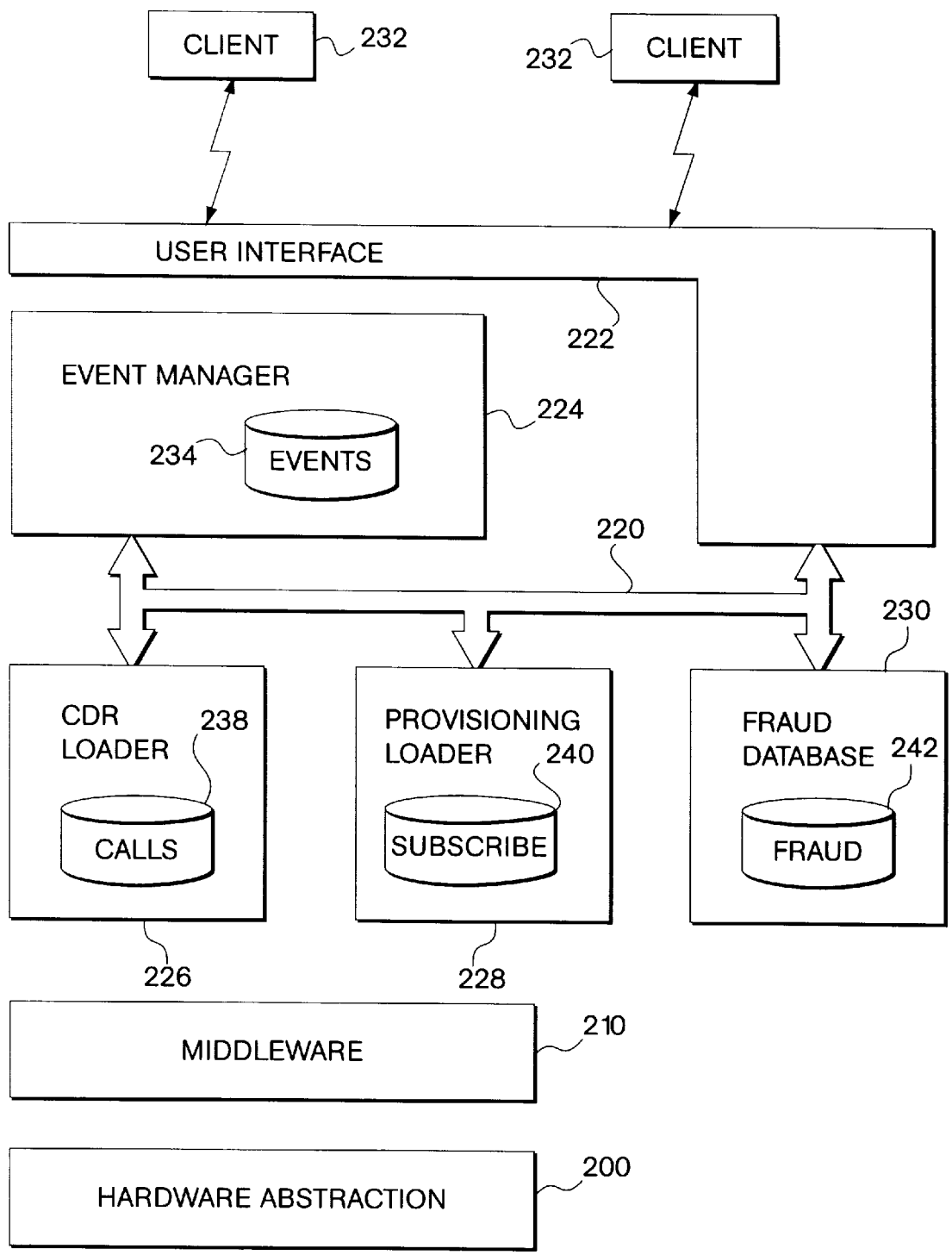
FIG. 2 is a block diagram of the software components used in a telecommunications fraud detection system according to an embodiment of the present invention.

FIG. 2 is a block diagram of the software components used in a telecommunications fraud detection system according to an embodiment of the present invention. The software components operate on, for example, the CDR loader 104, the event manager 106, the fraud database 108, the provisioning loader 112, and the web server 114 of FIG. 1. A hardware abstraction layer 200 provides a hardware-independent foundation for software components, and typically includes an operating system such as Windows NT, UNIX, or a UNIX derivative. A middleware layer 210 provides for communication among software components. In one embodiment, the middleware layer 210 includes C++ class libraries for encapsulating processes in a message-oriented environment. The classes define components and hierarchies for client/server control, tokens (basic data packets and structures), communications, and shared memory, and provide functionality for messaging, mailboxes, queues, and process control. In particular, the middleware 210 provides a message-oriented environment that establishes a communication path 220 between a user interface process 222, an event manager process 224, a CDR loader process 226, a provisioning loader process 228, and a fraud database process 230, such that the processes may communicate independent of the network and computer topology of the fraud detection system 100. The software includes one or more clients 232, executing on analyst devices 116 to present a user interface to human analysts.

The event manager process 224 receives events from the CDR loader process 226, the provisioning loader process 228, and the fraud database process 230. The event manager process 224 uses events to maintain scores for current subscribers. The event manager also maintains an investigation queue which includes subscribers who's scores suggest a heightened likelihood of fraud. The events and scores are maintained in an event database 234, which may be embodied, for example, on a mass storage device under control of a database management system such as that sold by Oracle.

The CDR loader process 226 includes a switch interface (not shown) to receive CDR's from a switch 102, and uses a call database 238 to store CDR's. The provisioning loader process 228 includes an interface to a provider billing system (not shown) and uses a subscriber database 240 to store provisioning data from the billing system. The fraud database process 230 includes a fraud database 242 that stores data concerning identities associated with fraud. The user interface process 222 operates as a front-end server to the clients 232. The user interface process 222 may use any programming language suitable to client-server processes, preferably HTML, Java, Visual Basic, XML or some other graphically oriented language (or combination of languages). The user interface process 222 also provides a functional interface through which a client 232 may inspect information in the event database 234, the call database 238, and the subscriber database 240 during the course of an investigation.

Figure 3:
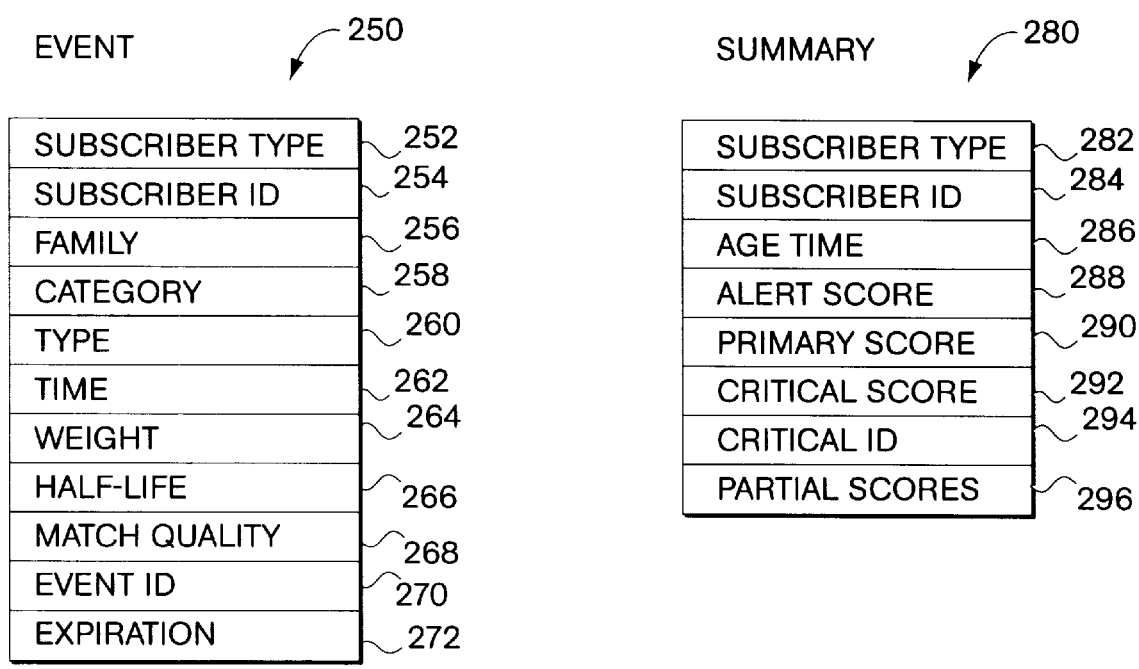
FIG. 3 shows the data records used by an embodiment of an event manager according to the principles of the invention.

FIG. 3 shows the data records used by an embodiment of an event manager according to the principles of the invention. The foregoing elements of each event 250 are fields within a database record. Each event 250 received from one of the event generators includes a subscriber type 252, which is either primary (account level) or secondary (subscriber level). A subscriber identifier 254 denotes the specific subscriber/account. By storing subscriber identification information in this two-tiered manner, the event manager can meaningfully distinguish between behavior of a subscriber, and behavior of a specific account of a subscriber. Each event 250 includes a family 256, which is generally "fraud", but allows for other event types. A category 258 identifies the event generator source, and a type 260 identifies a particular type of event from the event generator specified by the category 258. The time 262 of the event 250 is included.

Each event 250 includes a weight 264 that represents a numerical value associated with each event 250, a half-life 266 that represents the rate at which the weight diminishes, a match quality 268 that represents a degree of correspondence between the subscriber and a subscriber having a known history of fraud, as well as an event identifier 270 and an expiration date 272 that are assigned to each event 250 as it is received by the event manager process 224. The use of these fields will be explained in further detail below.

Each summary 280 includes a subscriber type 282 and a subscriber identifier 284 that correspond to the subscriber type 252 and the subscriber identifier 254 used in each event 250. Each summary 280 also includes an age time 286 that indicates the last time that an alert score 288 was aged using the half-life 266. The alert score 288 is a composite score used to prioritize investigation. The alert score 288 is preferably a sum of a primary score 290, the score for a particular subscriber, and a critical score 292, the highest score for any account of the subscriber. A critical identifier 294 indicates the account to which the critical score 292 corresponds. An array of partial scores 296 is also included in the summary 280, and includes partial scores (weights) for the subscriber, along with associated half-lives. Each summary 280 is stored in a "bulletin board," a non-permanent, shared memory area used by the event manager process 224 and the other processes of the fraud detection system. It will be appreciated that each event 250 and each summary 280 may include other fields with additional subscriber information, event information, or system administration information for use in the fraud detection system 100.

Figure 4A:
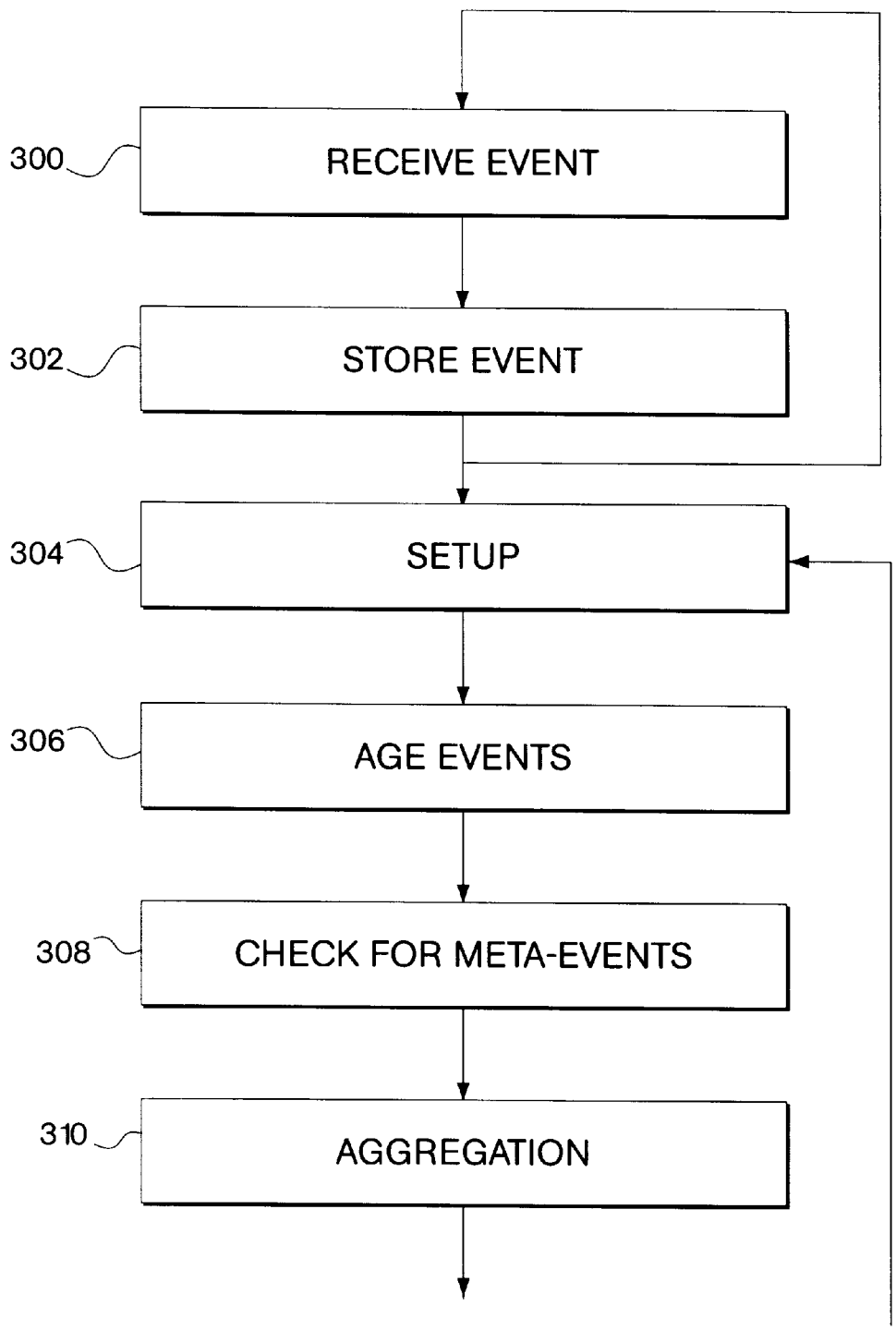
FIGS. 4A–4B are a flow chart showing event management according to the principles of the invention.
Figure 4B:
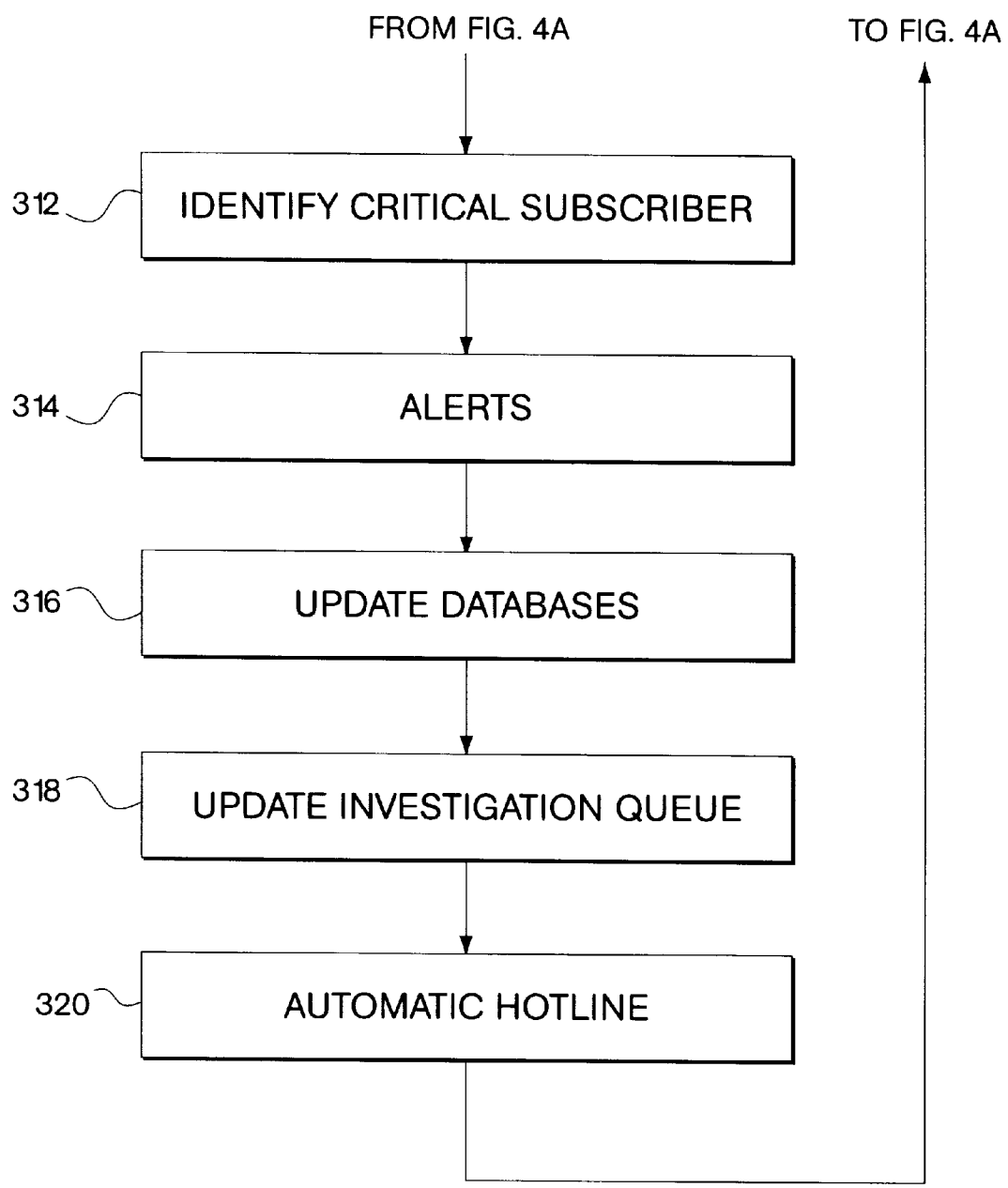

FIGS. 4A–4B are a flow chart showing event management according to the principles of the invention. In one embodiment, each step is a task operating within the event manager process 224. Event management conceptually begins with the event manager process 224 receiving an event message, as shown in step 300. The event message may include one or more events 250 generated, for example, by the CDR loader 226, the provisioning loader 228, or the fraud database 230. In step 300, an event receiver task checks for valid data and assigns an event identifier 270 and an expiration date 272 to each event 250. The events 250 contained in the event message are then stored in the event database 234, as shown in step 302. The event manager process 224 is preferably multi-threaded, such that the process 224 may return to step 300 to receive a new event message at the same time that control is passed to a setup task, as shown is in step 304.

In step 304, each event 250 is prepared for further analysis. In particular, existing summaries 280 and other data for a subscriber type 252 and subscriber identifier 254 are retrieved from databases as necessary and placed on to the bulletin board for common use by the event manager process 224 and the other processes and tasks.

In step 306, events are aged. Each event 250 has, associated therewith, a half-life 266 which describes the manner in which the weight 264 decreases in value over time. In a preferred embodiment, the half-life is the amount of time for the weight 264 to decrease by fifty percent, thus denoting an exponential decay. It will be appreciated that linear decay, or some other time-sensitive de-weighting may be used to age events. Events may be aged on an as-needed basis. That is, instead of aging every event 250 daily, events 250 for a subscriber may be aged when an event 250 for that subscriber is received. To facilitate this calculation, the summary 280 for a subscriber includes the most recent aging as an age time 286. In addition, a daily ager task is provided, which operates once each day to age weights for any subscriber having an "open investigation." The open investigation is a subscriber/account on an investigation queue, which will be described in more detail with reference to step 314.

In step 308, the event manager process 224 checks for any meta-events. Meta-events are combinations of events, possibly in conjunction with other information, which indicate a likelihood of fraud beyond that suggested by pre-assigned event weights. In step 308, the event manager process 224 may be configured to perform any test on any combination of events and/or other data available in the fraud detection system 100. For example, in a "persistent fraud" meta-event, the subscriber type 252 and subscriber identifier 254 are checked against known occurrences of fraud recorded in the event database 234 by the event manager process 224. If the subscriber type 252 and the subscriber identifier 254 for an event 250 indicate a subscriber with a status of fraud found, then a meta-event with a high score is generated for that subscriber. Step 308 may include several such tests, which may be performed sequentially or in parallel, and each of which may generate its own meta-event. After all such tests have been completed, the event manager process 224 may proceed.

In step 310, an aggregator task updates the summaries 280 to reflect received events and meta-events. The partial scores 296 and primary score 290 are updated. A new critical score 292 may be determined, an new alert score 288 calculated therefrom. However, as the critical score identifier 294 may change due to the events, it is preferred to defer calculation of a new alert score 288 until a critical subscriber (and associated critical identifier 294) has been determined.

In step 312, a critical subscriber is identified. Of all of the accounts of a subscriber, i.e., the subscriber identifiers 254 of a subscriber type 252, only an account with a highest qualifying score is used to calculate the alert score 288. In a preferred embodiment, a score is not qualifying if there has been an investigation for the subscriber identifier 284 within a pre-determined time that has resulted in a positive (i.e., fraud) outcome.

In step 314, alerts are created. Once the critical subscriber has been identified, the alert score 288 may be calculated for a subscriber/account, as identified by the subscriber type 282 and subscriber identifier 284. A new alert for the summary 280 is generated if the alert score 288 changes, and will be one of "add," "remove," or "changed." An investigation queue of "open investigations" is maintained, which includes each subscriber/account having an alert score 288 meeting or exceeding the alert threshold. The alert provides instructions to a separate task that is responsible for maintaining the investigation queue, i.e., prioritizing the queue according to alert scores 288 and handling analyst requests for an open investigation. An add alert is generated when the alert score 288 first meets or exceeds the alert threshold. A remove alert is generated to automatically close an open investigation when the alert score 288 falls below the alert threshold, with the caveat that the open investigation will not be closed if it is currently associated with an analyst. The changed alert is generated when the alert score 288 changes. In addition, no alert will be generated within a predetermined period (an "alert delay") after a finding of fraud relative to a subscriber/account.

In step 316, databases are updated. The preceding steps operate on the bulletin board, which is a non-permanent memory. However, any changes with respect to event logging, scores, summaries, and the like, should be permanently recorded in the databases. In one embodiment, there is no locking on the databases, so there is a chance that a change by one task or process may collide with a change from another task or process. Failed changes are detected using a version counter for the databases, and a failed change causes each step including and after setup 304 to be repeated. After a maximum number of tries, events 250 may be stored in a separate file for future recovery.

In step 318, the investigation queue is updated according to any alerts. The investigation queue is then prioritized such that when a client 232 (operated by an analyst) requests an open investigation, the client 232 will receive the open investigation having the highest score.

In step 320, an automatic hotline is provided. This task can generate a message to a service provider for immediate termination of an account when the alert score 288 exceeds a predetermined value. Alternatively, in a trial phase for the automatic hotline, the message may be logged so that a carrier can observe the affect on customers prior to implementing the automatic hotline.

Figure 5:
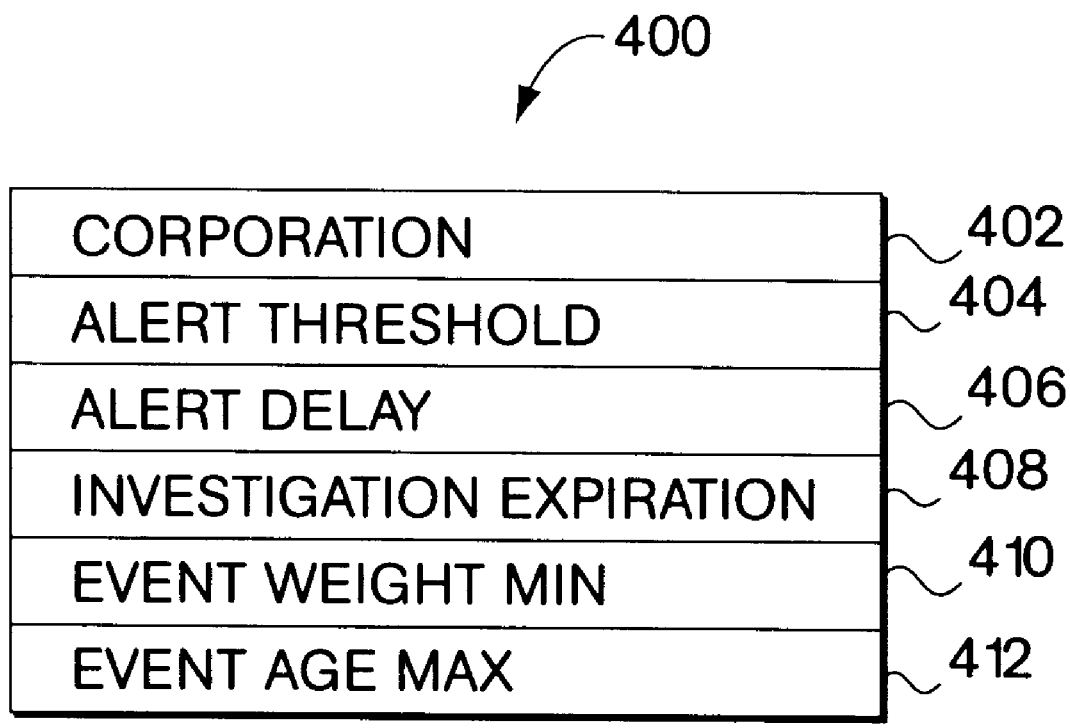
FIG. 5 shows system parameters for a fraud detection system according to the principles of the invention.

FIG. 5 shows system parameters for a fraud detection system according to the principles of the invention. The system parameters 400 may be stored on the event manager 106, or in some other memory within the fraud detection system 100. The system parameters 400 include a corporation 402, along with any corporate hierarchical information such as a company, division, or market. The system parameters 400 include an alert threshold 404 that determines the alert score 288 at which an investigation is opened. The alert threshold 404 may be customized for a particular provider. An alert delay 406 determines the amount of time to wait, after detecting fraud, before generating additional alerts for a subscriber/account. An investigation expiration 408 determines the amount of time after an investigation is closed that it should be purged. Individual events are also purged when their aged weights fall below an event weight minimum 410. Events may also be purged after a predetermined time, as established by an event age maximum 412. These user-configurable parameters permit system resources to be tailored to event traffic.

Generally, each event generator 226, 228, 230, 232 (and the event manager 224 for meta-events) is responsible for providing a weight for each event that it generates. These weights are determined (estimated) using a scoring model based upon known techniques of conditional probability and logistic regression. The weights are preferably scaled and shifted to provide a scoring model in which any score above zero indicates a significant likelihood of fraud. In one embodiment, the scoring model is a logit(x) function scaled from −200 to 1000, with a score of 400 representing a 0.5 probability of fraud. In a preferred embodiment, the scores are presented to a client 232 in textual form, i.e., "force alert," "high," "medium," "low," "zero," etc. It will be appreciated that other mathematical techniques may be used, provided they can discriminate among events to determine events carrying an increased likelihood of fraud. For example, a neural network may be trained to evaluate events based upon known instances of fraud. A neural network may also be used to generate the alert score 288 in step 314 above.

The event manager process 224 may internally generate meta-events. However, other events handled by the event manager process 224 are received from other processes within the fraud detection system 100. For example, an investigation outcome event is generated by a client 232 when an analyst closes an investigation. If the analyst has determined that there is no fraud, then this information is entered into the user interface presented to the analyst by the client 232 and user interface process 222. The client 232 then generates an event having a negative score, which indicates a reduced likelihood of fraud. Another event that may be generated by the client is a very important person ("VIP") event. The VIP event carries either a positive or a negative score indicative of the analyst's estimate of a necessary bias required to accurately assess risk. Additional event generators are discussed below.

The provisioning loader process 228 is an event generator. The provisioning loader 228 receives a stream of provisioning data from a billing system 110. Provisioning data is stored in the subscriber database 240. The provisioning data includes information such as new accounts, account changes, rate plan changes, and billing information such as payment, late payment, non-payment, payment method, and the like. This provisioning data is examined for potentially fraudulent behavior. The provisioning loader process 228 may generate events based upon this stream of provisioning data. In one embodiment, the provisioning stream is provided to the provisioning loader process 228 several times each day. Other configurations are possible instead of, or in addition to, this stream. For example, if available from the carrier, a real-time provisioning feed may be used to generate events in near-real-time as new accounts are added or existing account information is changed.

FIG. 6 shows the events 420 generated by one embodiment of the provisioning loader process 228, using monthly billing information. The events 420 may be categorized by a category 422, a type 424, and a sub-type 426. A first category 422 is "change," which has two types 424: info 430 and rate plan 432. The info 430 type has sub-types "name," "address," "phone," and may include any other billing information recorded for a subscriber. A change to "info" may not, by itself, suggest fraud. However, repeated changes over a short period of time may indicate a heightened likelihood of fraud, and these events are preferably weighted with long half-lives and weights such that two or three occurrences will exceed the alert threshold 404.

Another type 424 of the category 422 change is rate plan 432. The sub-type for rate plan 432 denotes the amount of time since the account was created, one of thirty, sixty, ninety, or ninety-plus days. By creating sub-types for this type, a weight and a half-life may be accorded to a rate plan change according to how long the account has existed. For example, a low weight may be assigned to rate plan changes in the first thirty days of a new account if the carrier permits free changes in that time period. In subsequent periods, changes are expected to be less frequent, and will be accorded greater weight and longer half-lives.

Another category 422 of event for the provisioning loader process 224 is billing. A first type 424 of this category 422 is pay 434. A pay 434 event indicates generally that a bill has been paid, and has associated therewith a negative weight to indicate a reduced likelihood of fraud. The weight according to a particular pay 434 event will depend on the manner in which payment was made. Thus the pay 434 type 422 has several sub-types 426, including "cash," "check," "verified funds," "credit," "pre-paid card," and "debit." Each sub-type has associated therewith a weight and a half-life. In a preferred embodiment, payments made in "cash" or "verified funds" such as a verified check or money order receive stronger negative weights. Those forms of payment which are subject to fraudulent use, such as credit cards, will receive negative weights of less magnitude. Where a "credit" or "debit" card is used, it may further be desirable to query the fraud database 242 for an exact match with a number associated with fraud.

An event of the billing category 422 may also have a type 424 of non-payment ("NPAY") 436. This may be a generic non-payment ("GEN"), a pre-paid card with a positive balance ("PPCPB"), or a partial payment ("PARTP"). In a preferred embodiment, the match quality 268 for a partial payment billing event 436 is proportional to the amount of the bill that has been paid.

A credit card link 438 category generates events based upon a link to the fraud database 242. Accounts are generally secured by a credit card. Each time a credit card changes for an account ("ACC"), or is used to pay a bill ("BILL"), a query is transmitted to the fraud database process 230, which will search for exact matches in the fraud database 242. This information is used by the provisioning loader process 228 to generate events indicative of fraud. In addition, the subscriber database 240 may be examined for any other subscribers or accounts using the same credit card number.

The fraud database process 230 also operates as an event generator. In addition to the exact matching process used for credit card (or debit card) numbers, the fraud database process 230 includes a fuzzy matching process. The fuzzy matching process receives provisioning information from the provisioning loader process 228 each time that the provisioning loader process 228 detects a change in subscriber information (or a new account). The fuzzy matching process generates events based upon matches or near matches with records in the fraud database 242. These records may be subscribers or accounts associated with instances of known fraud, subscribers or accounts with instances of suspected fraud, or identities otherwise associated with fraud. The fuzzy matching process is described below.

Figure 7:
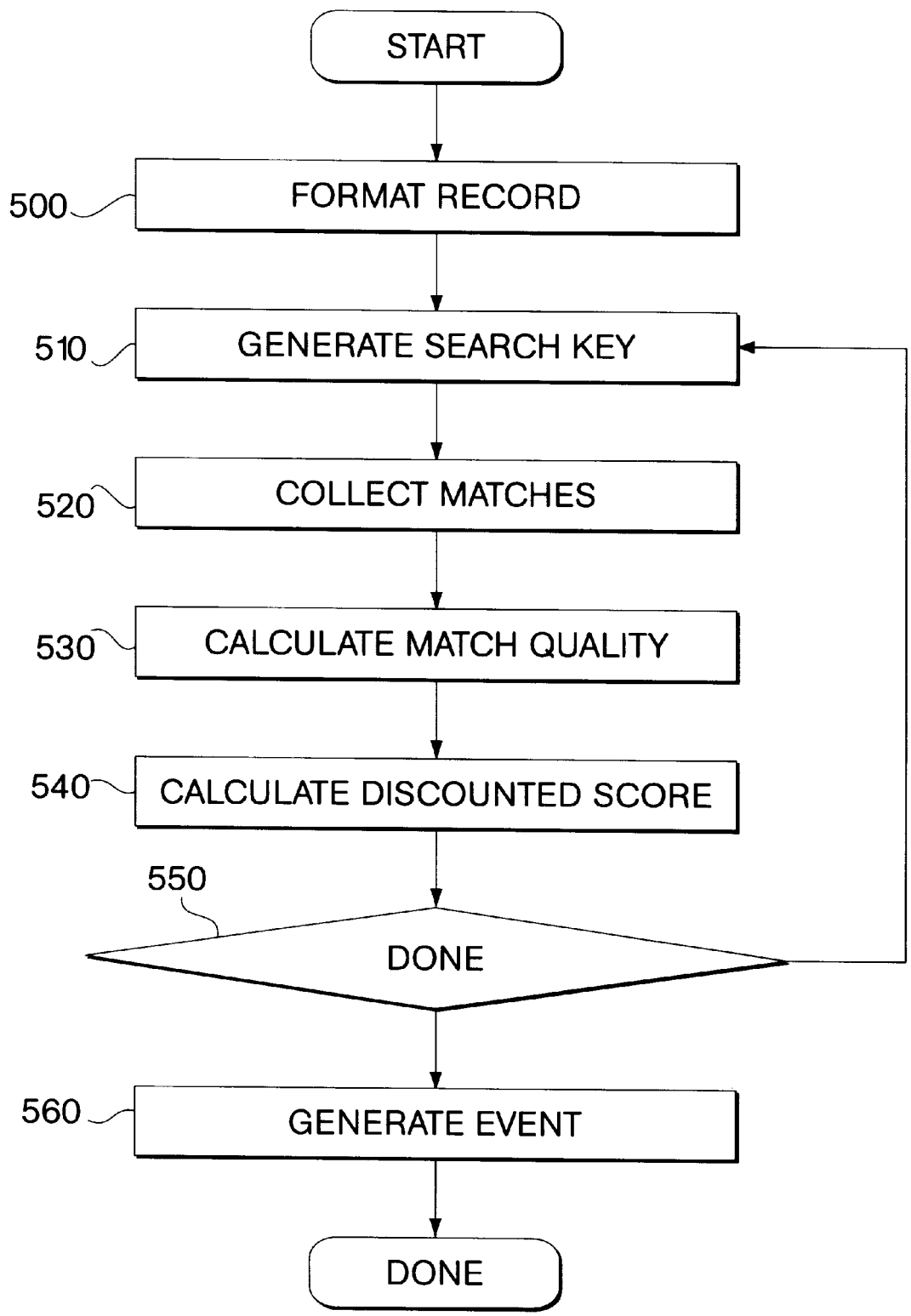
FIG. 7 is a flow chart of a fuzzy matching process used in a preferred embodiment of the fraud detection system.

FIG. 7 is a flow chart of a fuzzy matching process used in a preferred embodiment of the fraud detection system 100. Generally, each record received from the provisioning loader process is tested against the fraud database 242 by the fuzzy matching process, and the output is a stream of matching events. As used herein, the terms "account change data" or "account change information" are intended to refer to the subset of provisioning data that is forwarded from the provisioning loader process 228 to the fraud database process 230. This is preferably a subset of provisioning data that corresponds to account changes and new accounts.

In step 500, a received record of account change data is formatted for processing by the fuzzy matching process. This may include, as necessary, parsing of the record and suppression of any user-specified values. In a preferred embodied, particular fraud records may also be suppressed in the fraud database 242, so that subsequent searching by the fuzzy matching process will pass over those records.

In step 510, a search key is generated for a particular field or fields of the record. Where the fuzzy matching is performed on an account change, search keys may be limited to those corresponding to the changed fields. For new accounts, search keys are preferably generated for every category that is not suppressed. Each search key defines those fields of an incoming record that should be used for a particular search. Search keys preferably include an individual name, a business name, an address, a telecommunications number, an identification number, and an equipment serial number. It is noted that credit card numbers use an exact match, as described above. For the address, the search key preferably includes a street name, city, two-character state code, and five or nine character postal code.

In step 520, possible matches are collected. The matches are collected by applying a set of comparison rules to the search key fields in the account change record and the search key fields in each record in the fraud database. The comparison rules are established separately for each search key. For an individual name, possible matches are preferably returned for an exact match, a match of last name and a first letter of one or more first and middle names, a one-off character match with a name, an eighty percent character match, an eighty percent character match with two transposed letters, a short word exactly matching the first letters of a long word, and out of order names. A normalized match may also be used, in which a given name is converted using a name synonym table (i.e., "Bob"→"Robert").

For a business name, different matching rules are applied. Naturally, exact matches are returned. Matches will also be collected for business names with the same words in a different sequence. For business names with more than 4 characters, a match will also be collected for 80% character matching. Two transposed characters are also collected if at least 80% of the characters match for each word. In addition, exact matches for shorter strings will be collected. Normalized business names are preferably used. In a normalized business name, common abbreviations are expanded (i.e., "IBM"→"International Business Machines") using a table of known abbreviations, and common extensions such as Corp. or Corporation are removed.

For an address, matches are generally collected for 80% character matches of words with more than four characters, and for words with two transposed characters, without reference to the order in which the words appear. Substring matches are also collected by matching shorter words against the left-most characters of a longer word. Matches are also collected for one-off character matches of street numbers. Address matches will only be collected for an exact match of the state, city, and postal code.

For telecommunications numbers, matches are collected for exact matches of the country number, area code, prefix, and subscriber number. A "wild card" match may also be used, such that a match is collected if every digit except for the wild card digit(s) are an exact match. In a preferred embodiment, a wild card may be a three-digit area code or a three-digit prefix.

Identification numbers may be driver's licenses, Social Security numbers, Federal Tax ID numbers, or other numbers uniquely identifying individuals or entities. For identification numbers, matches are collected for exact matches, one-off matches, all-but-one character matches, and two transposed character matches. For equipment serial numbers, only exact matches are collected.

In step 530, a match quality is calculated for each match collected, according to a set of predetermined rules. The predetermined rules are established separately for each search key. For an individual name, match quality is calculated by taking the percentage of characters of a shorter string that match a longer string. Match quality is calculated for both a first and last name in this inquiry. An exact match on two words of the same length receives a match quality of 100%. The match quality is otherwise scaled according to the nature of the match (exact match, substring match, one-off match, two-off match) and the length of the shorter word (1 character, 2–4 characters, 5–7 characters, 8+ characters). For example, in a preferred embodiment, an exact match with a shorter word length of one character is a 100% match, while a one-off match with a word of 5–7 characters is an 80% match. The match quality for each nature-of-match and length-of-shorter-word may be user configured.

For business names, match quality is determined by calculating the percentage of characters of shorter strings that match longer strings. Match quality is calculated for each word in the business name. An exact match on two words of the same length receives a match quality of 100% regardless of the length of the two words. The match quality is scaled according to the nature of the match and the length of the shorter word. For example, an exact match of only one character will receive a weight of 80%. Similarly, while a one-off match of a 2–4 character word will receive a match quality of 0%, a one-off match for a 5–7 character word will receive an 80% match quality, and a one-off match for an 8+ character will receive a 90% match quality. These match qualities are user configurable.

For addresses, a match quality is determined by finding the percentage of characters of the shorter street address (and unit number, if available) that match the longer street address. The match quality is weighted equally for each separate word of the address. Any exact match of two words of the same length receives a match quality of 100% regardless of the length. Match quality is otherwise scaled according to the nature of the match and the length of the shorter word. In a preferred embodiment, these match qualities are the same as those for individual names. The match qualities are user configurable. The city, state, and postal code has a match quality of either 100% (exact) or 0%.

For telecommunications numbers, an exact match or an exact wild card match is assigned a match quality of 100%. Any other match is assigned a match quality of 0%.

For identification numbers, an exact match is assigned a match quality of 100%, a one-off match is assigned a quality of 90%, and a two-off match is assigned 80%. For equipment serial numbers, each exact match is assigned a match quality of 100%.

In step 540, a discounted score is calculated for each matching record. For an individual name, the discounted score is a sum of the first name match and the last name match, multiplied by the weight assigned to the individual name element. The sum is preferably weighted so that a last name match is accorded greater significance than a first name match. In one embodiment, the first name is weighted as 0.35 of the total, and the last name is weighted as 0.65 of the total score. As a further modification, the weight may be distributed among multiple first names and initials. For example, two matching first names may be weighted at 100% while to matching first initials will only be weighted at 80%. Out-of-sequence matches are preferably assigned 80% of the match quality for a corresponding in-sequence match.

For a business name, the discounted score is a weighted sum of the match quality for each word in the business name, multiplied by the weight assigned to business names. All words of the business name are treated equally, however, out of sequence matches are weighted at 80%.

For an address, the discounted score is a weighted sum of the match quality for each word. Out of sequence matches are adjusted to 80% of the match quality for the corresponding in-sequence match. In a preferred embodiment, the total score is weighted as 0.50 city/state and postal code match, and 0.50 street address match. Alternatively, if a unit number is available, the score is weighted 0.20 unit number, 0.50 city/state and postal code, and 0.40 street address match.

For telecommunications numbers, the discounted score is the match quality (0% or 100%) multiplied by the weight assigned to a telecommunications number.

For identification numbers, the discounted score is the match quality multiplied by the weight assigned to identification numbers. For equipment serial numbers, the discounted score is the weight assigned to serial numbers.

It will be appreciated that steps 510–540 are repeated for each search key defined for the fuzzy matching process. In step 550, the fuzzy matching process checks if all search keys have been applied to an account change record, and returns to step 510 when one or more search keys for a record have not been tested. When each defined search key has been tested, the fuzzy matching process proceeds to step 560.

In step 560, an event may be generated. In one embodiment, an event is only generated when the fuzzy matching process generates a non-zero score for a record. Alternatively, an event may only be generated when the discounted match score exceeds a predetermined threshold. In a preferred embodiment, a different event may be generated for each search key, such that a single account change record may generate more than one event if more than one search key for that account change record results in a match.

It will be appreciated that the fuzzy matching process is intended generally to locate account information similar to records in the fraud database 242. Other search keys and scoring techniques may be used, consistent with the processing power of the fraud database 108, provided they identify similarity between records and generate corresponding events in a timely fashion.

A human analyst accesses the fraud detection system 100 by using the client 232. The client provides a user interface, preferably a graphical user interface, to the analyst, by which the analyst may request and receive subjects for investigation from the investigation queue. In one embodiment, an analyst requesting an investigation receives the open investigation on the investigation queue having the highest score. Where analysts are geographically distributed over a large area, it may be desirable to assign to an analyst the open investigation having the highest score in that analysts region. Alternatively, separate investigation queues may be maintained for each geographic region. When the analyst receives the open investigation, or summary information therefore, the open investigation is locked so that no other analyst may work on the same investigation. Through the user interface 222, the analyst may conduct an investigation by examining any data in the system relating to the subscriber/account, including data in the event database 234, the call database 238, the subscriber database 240, and the fraud database 242. An investigation concludes with a finding of fraud, a finding of no fraud, or an indeterminate finding. Each of these findings, when entered by the analyst, is an additional fraud detection event.

Figure 8:
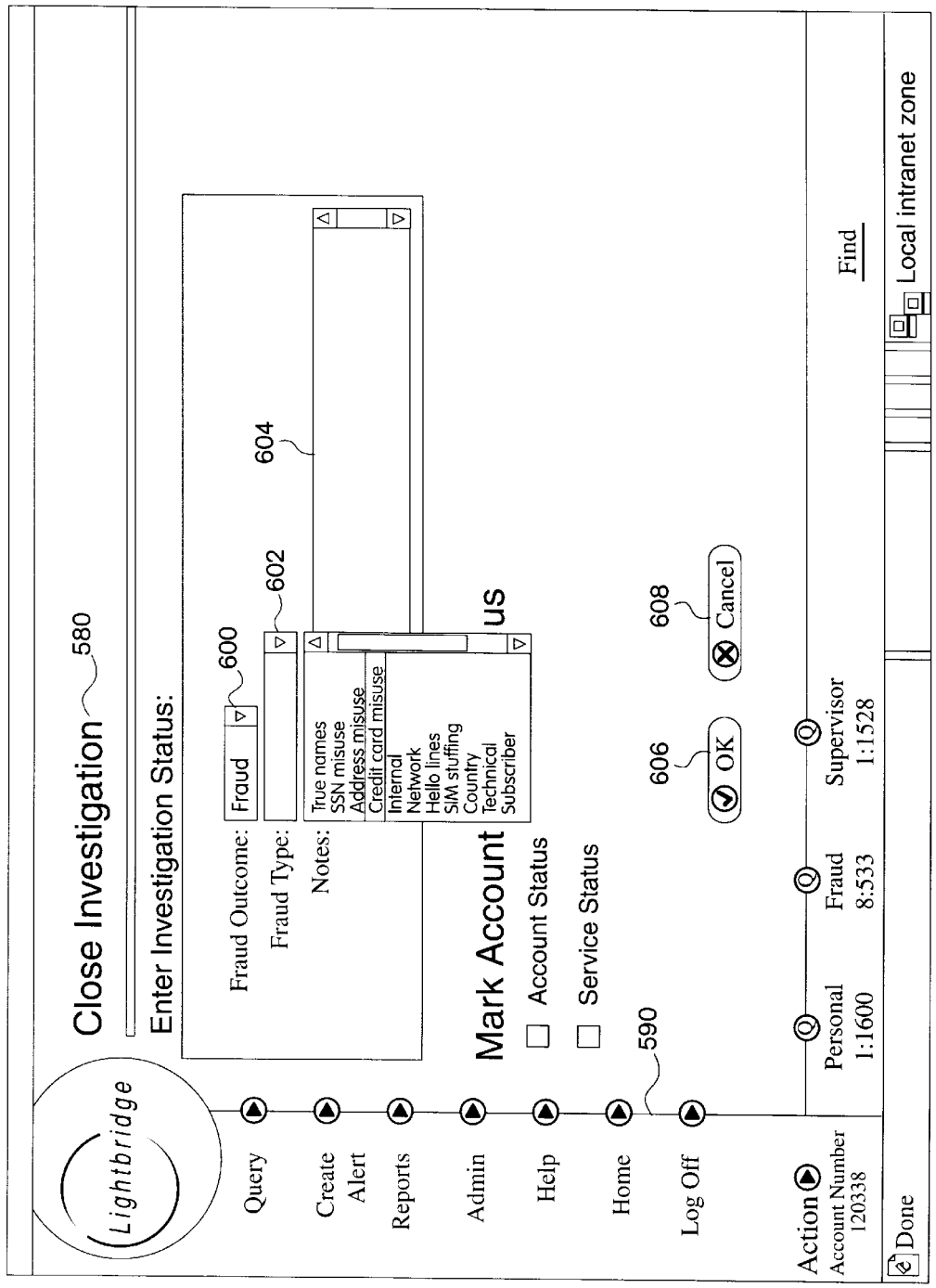
FIG. 8 shows a graphical user interface screen presented by the client.

FIG. 8 shows a graphical user interface screen presented by the client 232. The depicted screen is a "close investigation" screen in which an analyst enters a resolution of an investigation. A title bar 580 describes the page being viewed. Instructions 585 relevant to the page may be displayed below the title bar 580. General tools are provided in a tool bar 590 along the left side of the screen. A fraud outcome is specified in a drop-down list 600. A fraud type may also be selected from a drop-down list 602 of recognized fraud types. A text box 604 is provided for an analyst to enter additional notes concerning the investigation. When the fraud outcome and the fraud type have been selected, the analyst may close the investigation by selecting an "OK" box 606. The analyst may instead cancel the close investigation operation by clicking a "Cancel" box 608, and proceed with additional investigation. The interface screen depicted in FIG. 8 is not intended to be limiting. It will be appreciated that numerous graphical user interface tools and objects are known in the art and may be used with a graphical user interface according to the invention. It will further be appreciated that other screens are preferably also used, for example, to handle requests for new investigations, provide summary information to an analyst, and to investigate records and call histories of a subject under investigation.

The user interface process 222 may, in addition to providing a functional interface between the clients 232 and the rest of the fraud detection system 100, also be used to track analyst productivity. Analyst actions may be logged, with time stamps, for future analysis of time spent in individual and aggregate analysis.

In a preferred embodiment, a graphical user interface is provided for administration of the system, including control of weights and half-lives for each event, and for controlling the system parameters such as those described in reference to FIG. 5. A number of user interfaces and graphical user interface tools are known in the art, and may be adapted to administration of a fraud detection system operating according to the principles of the invention. It will further be appreciated that such a system will preferably include security to prevent unauthorized modifications thereto.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for detecting fraud in a telecommunications system comprising:
   receiving one or more events relating to a subscriber;
   combining the one or more events to provide a score;
   storing the subscriber and the score in an investigation queue if the score exceeds a predetermined threshold;
   repeating the method for a plurality of subscribers;
   storing a plurality of suspect subscribers in the investigation queue, each one of the plurality of suspect subscribers having a score that exceeds the predetermined threshold; and
   updating the score of one of the plurality of suspect subscribers to provide an updated score, and removing the one of the plurality of suspect subscribers from the investigation queue if the updated score does not exceed the predetermined threshold.

2. The method of claim 1 further comprising assigning a human analyst to investigate one of the plurality of suspect subscribers.

3. The method of claim 1 further comprising:
   determining a region for each one of the plurality of suspect subscribers; and
   assigning a regional human analyst to investigate those ones of the plurality of suspect subscribers having a particular region.

4. The method of claim 2 wherein assigning a human analyst further comprises:
   receiving a request to investigate from the human analyst;
   assigning to the human analyst a one of the plurality of suspect subscribers having a highest priority; and removing the one of the plurality of suspect subscribers from the investigation queue.

5. The method of claim 4 wherein combining the one or more events to provide a score further comprises:

weighting the one or more events according to one or more event weights, thereby providing one or more weighted events; and summing the one or more weighted events to provide a score.

6. A method for detecting fraud in a telecommunications system comprising:

receiving one or more events relating to a subscriber;

combining the one or more events to provide a score;

weighting the one or more events according to one or more event weights, thereby providing one or more weighted events;

summing the one or more weighted events to provide a score;

storing the subscriber and the score in an investigation queue if the score exceeds a predetermined threshold; and aging each of the one or more weighted events using a half-life.

7. A method for detecting fraud in a telecommunications system comprising:

receiving one or more events relating to a subscriber;

combining the one or more events to provide a score;

weighting the one or more events according to one or more event weights, thereby providing one or more weighted events;

summing the one or more weighted events to provide a score; and storing the subscriber and the score in an investigation queue if the score exceeds a predetermined threshold;

wherein the one or more event weights are discounted according to a match quality.

8. A method for detecting fraud in a telecommunications system comprising:

receiving one or more events relating to a subscriber;

combining the one or more events to provide a score;

weighting the one or more events according to one or more event weights, thereby providing one or more weighted events;

summing the one or more weighted events to provide a score; and storing the subscriber and the score in an investigation queue if the score exceeds a predetermined threshold;

wherein the one or more event weights are determined using logistic regression.

9. A method for detecting fraud in a telecommunications system comprising:

receiving one or more events relating to a subscriber;

combining the one or more events to provide a score;

feeding the one or more events to a neural network, the neural network being trained to generate a score indicative of possible fraud from the one or more events;

storing the subscriber and the score in an investigation queue if the score exceeds a predetermined threshold;

repeating the method for a plurality of subscribers;

storing a plurality of suspect subscribers in the investigation queue, each one of the plurality of suspect subscribers having a score that exceeds the predetermined threshold.

10. The method of claim 9 further comprising prioritizing the investigation queue according to the plurality of scores.

11. A system for detecting telecommunications fraud comprising:

means for receiving one or more events relating to a subscriber;

means for combining the one or more events to provide a score;

means for weighting the one or more events according to one or more event weights, thereby providing one or more weighted events;

means for summing the one or more weighted events to provide a score;

means for storing the subscriber and the score in an investigation queue if the score exceeds a predetermined threshold; and means for aging each of the one or more weighted events using a half-life.

12. A system for detecting telecommunications fraud comprising:

means for receiving one or more events relating to a subscriber;

means for combining the one or more events to provide a score;

means for weighting the one or more events according to one or more event weights, thereby providing one or more weighted events;

means for summing the one or more weighted events to provide a score; and means for storing the subscriber and the score in an investigation queue if the score exceeds a predetermined threshold;

wherein the one or more event weights are discounted according to a match quality.

13. A system for detecting telecommunications fraud comprising:

means for receiving one or more events relating to a subscriber;

means for combining the one or more events to provide a score;

means for weighting the one or more events according to one or more event weights, thereby providing one or more weighted events;

means for summing the one or more weighted events to provide a score; and means for storing the subscriber and the score in an investigation queue if the score exceeds a predetermined threshold;

wherein the one or more event weights are determined using logistic regression.

14. A system for detecting telecommunications fraud comprising:

means for receiving one or more events relating to a subscriber;

means for combining the one or more events to provide a score;

means for feeding the one or more events to a neural network, the neural network being trained to generate a score indicative of possible fraud from the one or more events;

means for storing the subscriber and the score in an investigation queue if the score exceeds a predetermined threshold;

means for applying the receiving means, the combining means, and the storing means to a plurality of subscribers; and means for storing a plurality of suspect subscribers in the investigation queue, each one of the plurality of suspect subscribers having a score that exceed the predetermined threshold.

15. The system of claim 14 further comprising means for prioritizing the investigation queue according to the plurality of scores.

16. A computer program for detecting telecommunications fraud embodied in machine executable code comprising:

machine executable code to receive one or more events relating to a subscriber;

machine executable code to combine the one or more events to provide a score;

machine executable code to weight the one or more events according to one or more event weights, thereby providing one or more weighted events;

machine executable code to sum the one or more weighted events to provide a score; and machine executable code to store the subscriber and the score in an investigation queue if the score exceeds a predetermined threshold; and machine executable code to age each of the one or more weighted events using a half-life.

17. A computer program for detecting telecommunications fraud embodied in machine executable code comprising:

machine executable code to receive one or more events relating to a subscriber;

machine executable code to combine the one or more events to provide a score;

machine executable code to weight the one or more events according to one or more event weights, thereby providing one or more weighted events;

machine executable code to sum the one or more weighted events to provide a score; and machine executable code to store the subscriber and the score in an investigation queue if the score exceeds a predetermined threshold;

wherein the one or more event weights are discounted according to a match quality.

18. A computer program for detecting telecommunications fraud embodied in machine executable code comprising:

machine executable code to receive one or more events relating to a subscriber, machine executable code to combine the one or more events to provide a score;

machine executable code to weight the one or more events according to one or more event weights, thereby providing one or more weighted events;

machine executable code to sum the one or more weighted events to provide a score; and machine executable code to store the subscriber and the score in an investigation queue if the score exceeds a predetermined threshold;

wherein the one or more event weights are determined using logistic regression.

19. A computer program for detecting telecommunications fraud embodied in machine executable code comprising:

machine executable code to receive one or more events relating to a subscriber;

machine executable code to combine the one or more events to provide a score;

machine executable code to feed the one or more events to a neural network, the neural network being trained to generate a score indicative of possible fraud from the one or more events;

machine executable code to store the subscriber and the score in an investigation queue if the score exceeds a predetermined threshold;

machine executable code to repeat the machine executable code to receive, the machine executable code to combine, and the machine executable code to store for a plurality of subscribers; and machine executable code to store a plurality of suspect subscribers in the investigation queue, each one of the plurality of suspect subscribers having a score that exceeds the predetermined threshold.

20. The computer program of claim 19 further comprising machine executable code to prioritize the investigation queue according to the plurality of scores.

21. A method for identifying possibly fraudulent activity in a telecommunications system comprising:

providing a fraud record, the fraud record including a first plurality of fields;

providing an account change record, the account change record including a second plurality of fields;

providing a search key, the search key indicating one or more search key fields corresponding to fields of the account change record and the fraud record;

applying the search key and a first set of rules to the account change record and the fraud record, thereby determining whether there is a possible match;

calculating a match quality for the one or more search key fields if there is a possible match;

calculating one or more field match terms for each field of the search key, weighting each field match term, and calculating a weighted sum of the field match terms; and generating an event if there is a possible match, the event having a weight indicative of the quality of a match between the account change record and the fraud record.

22. A method for identifying possibly fraudulent activity in a telecommunications system comprising:

defining one or more events, each event corresponding to a category of account activity, assigning to each of the one or more events an event weight and an event half-life;

receiving a provisioning record, the provisioning record corresponding to an activity in an account;

determining which category of account activity corresponds to the provisioning record;

generating an event for the account activity, the event having the event weight and the event half-life of the category to which the account activity corresponds; and providing a plurality of provisioning records, thereby generating a plurality of events;

wherein the plurality of provisioning records is a real-time payment information stream from a carrier.

23. A method for identifying possibly fraudulent activity in a telecommunications system comprising:

defining one or more events, each event corresponding to a category of account activity, assigning to each of the one or more events an event weight and an event half-life;

receiving a provisioning record, the provisioning record corresponding to an activity in an account;

determining which category of account activity corresponds to the provisioning record;

generating an event for the account activity, the event having the event weight and the event half-life of the category to which the account activity corresponds; and providing a plurality of provisioning records, thereby generating a plurality of events;

wherein the plurality of provisioning records is a real-time account change information stream from a carrier.

24. A method for identifying possibly fraudulent activity in a telecommunications system comprising:

defining one or more events, each event corresponding to a category of account activity, assigning to each of the one or more events an event weight and an event half-life;

receiving a provisioning record, the provisioning record corresponding to an activity in an account;

determining which category of account activity corresponds to the provisioning record; and generating an event for the account activity, the event having the event weight and the event half-life of the category to which the account activity corresponds;

wherein one of the account activity categories is a change in account information.

25. A method for identifying possibly fraudulent activity in a telecommunications system comprising:

defining one or more events, each event corresponding to a category of account activity, assigning to each of the one or more events an event weight and an event half-life;

receiving a provisioning record, the provisioning record corresponding to an activity in an account;

determining which category of account activity corresponds to the provisioning record; and generating an event for the account activity, the event having the event weight and the event half-life of the category to which the account activity corresponds;

wherein one of the account activity categories is a change in bill payment information.

* * * * *